Patented May 7, 1940

2,199,789

UNITED STATES PATENT OFFICE 2,199,789

ASSISTANTS FOR THE TEXTILE AND RELATED INDUSTRIES AND THEIR MANUFACTURE

Kurt Engel, St. Louis, France, and Kurt Pfaehler, Basel, Switzerland, assignors to the firm J. R. Geigy A. G., Basel, Switzerland No Drawing. Application May 18, 1938, Serial No. 208,718. In Switzerland May 29, 1937

7 Claims. (Cl. 260—511)

This invention relates to a process for the production of water-soluble compounds of the aromatic series, and to the new products thereby obtained.

According to the present invention new water-soluble derivatives of the aromatic series are obtained by treating with sulphonating agents compounds of the following general formula

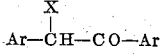

wherein Ar means aromatic residues and X in the ms-position means an aliphatic or alicyclic substituent with more than 5 C-atoms; the free positions of the aromatic nucleus can be suitably substituted, preferably however by organic residues.

As initial materials for the sulphonation there come into consideration desoxybenzoins substituted in the ms-position by aliphatic or alicyclic groups with more than 5 C-atoms. These, in part new compounds, are obtained easily by known processes (see for example Ber. d. Deutschen Chem. Gesellschaft vol. 21, page 1299 and vol. 25, page 2239). The sulphonated bodies obtained from these substituted desoxybenzoins constitute in the form of their soluble metal salts, valuable wetting, dispersing and emulsifying agents, their softening action being particularly interesting.

Example 1

Into 40 parts of sulphuric acid monohydrate there are introduced whilst stirring at 10° C., 20 parts of ms-octodecyl-p-methyl desoxybenzoin, thereupon there are slowly allowed to drop in 40 parts of oleum (26%) at 0–5° C. After stirring for 4 hours below 10° C. a sample inserted in water is found to be completely soluble. As soon as this is the case the reaction mass is poured on ice, the separated free sulphonic acid is removed; it is neutralised by the addition of soda lye. By evaporation the soda salt is obtained as a bright powder, which is very easily soluble in water, and of which the solution imparts excellent softness to cellulose regenerates and native cellulose.

Example 2

Into 40 parts of sulphuric acid monohydrate there are introduced whilst stirring at 10° C., 20 parts of ms-hexadecyl-desoxy-benzoin, thereupon at −5° C. 40 parts of oleum (66%) are allowed to drop in slowly and stirring takes place for 2 hours. Then the mixture is poured on to ice, neutralised and evaporated. There is obtained a white powder which forms a clear solution in water and constitutes an excellent softening agent for cellulose fibres.

When in this example hexadecyldesoxybenzoin is replaced by dodecyldesoxybenzoin or "Loryl"-desoxybenzoin ("Loryl" meaning the radical of technical dodecyl alcohol, containing also a number of homologues of dodecyl alcohol) there are obtained products with excellent capillary properties.

The possibility of variation is very considerable as the substituents can be varied within a wide range in the aromatic radicals, as also those on the meso-C-atom, whereby diverse capillary effects can be obtained.

Example 3

20 parts of ms-octodecyl-benzyl-diphenylketone of the formula

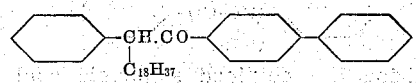

are introduced whilst stirring at 10°–20° C., into 40 parts of sulphuric acid monohydrate, 20 parts of fuming sulphuric acid (26% SO₃) added slowly at 0 to 5° C. and 20 parts of sulphuric acid (66% SO₃) at −5° to 0° C. After stirring for 6 hours below 10° C. a sample proves to be completely soluble in water. As soon as this is the case, the reaction mass is poured on to ice, the aqueous solution is neutralised with sodium hydroxide and evaporated. The sodium salt is obtained in the form of a bright powder.

Similar products are obtained by sulphonating ms-hexadecyl-benzyl-diphenylketone (made from benzyl-diphenylketone and cetylbromide) or by sulphonating α-phenyl-α-naphtoylnonadecan of the formula

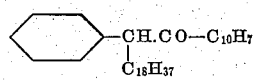

made from naphthyl-benzyl-ketone and octadecylbromide.

Other compounds capable of being sulphonated according to the above described processes are

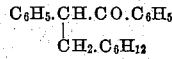

the reaction product of desoxybenzoin with a halogenide of technical naphthenic alcohol and so on.

What we claim is:

1. A process for the manufacture of assistants for the textile and related industries which comprises sulphonating compounds of the following general formula

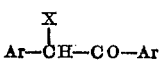

wherein Ar means an aromatic radical selected from the group consisting of phenyl and diphenyl radicals and X means a substituent with more than 5 carbon-atoms selected from the group consisting of alkyl and cycloalkyl radicals, neutralizing the obtained sulphonic acid and evaporating.

2. A process for the manufacture of assistants for the textile and related industries which comprises sulphonating compounds of the following general formula

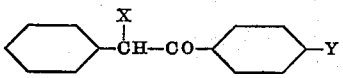

wherein X means an alkyl substituent with more than 10 carbon atoms and Y a substituent selected from the group of H, alkyl and phenyl, neutralizing the obtained sulphonic acid and evaporating.

3. A process for the manufacture of assistants for the textile and related industries which comprises sulphonating a compound of the following formula

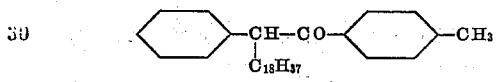

neutralizing the obtained sulphonic acid and evaporating.

4. A process for the manufacture of assistants for the textile and related industries which comprises sulphonating a compound of the following formula

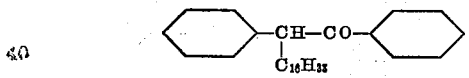

neutralizing the obtained sulphonic acid and evaporating.

5. A process for the manufacture of assistants for the textile and related industries which comprises sulphonating a compound of the following formula

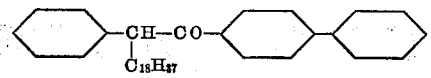

neutralizing the obtained sulphonic acid and evaporating.

6. Soluble salts of desoxybenzoin-sulphonic acids, corresponding in the free state with the following formula

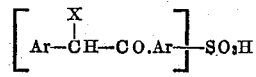

wherein Ar means an aromatic radical selected from the group consisting of phenyl and diphenyl radicals and X means a substituent with more than 5 carbon-atoms selected from the group consisting of alkyl and cycloalkyl radicals, being when neutralized and evaporated to dryness bright powders whose solutions show valuble capillary activity, exerting a very pronounced softening action on cellulosic fibres.

7. Soluble salts of desoxybenzoin-sulphonic acids, corresponding in the free state with the following formula

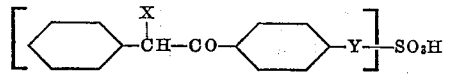

wherein X means an alkyl substituent with more than 10 carbon atoms and Y a substituent selected from the group of H, alkyl and phenyl, being, when neutralized and evaporated to dryness bright powders whose solutions show valuable capillary activity, exerting a very pronounced softening action on cellulosic fibres.

KURT ENGEL.
KURT PFAEHLER.